3,332,905
RUBBER COMPOSITIONS CONTAINING PHOSPHOROUS COMPOUNDS AS REINFORCING FILLERS AND METHOD OF PREPARATION
Archie C. Teter, Bartlesville, Okla., assignor to Phillips Petroleum Company, a corporation of Delaware
No Drawing. Filed Mar. 13, 1964, Ser. No. 351,862
8 Claims. (Cl. 260—41.5)

This invention relates to compounded and cured rubbers, both natural and synthetic, and their method of preparation. In another aspect, this invention relates to compounded and cured rubbers containing a novel reinforcing filler and their method of preparation.

Carbon black, which is the most commonly used reinforcing agent in natural and synthetic rubbers, is frequently replaced by other fillers for application in which a white or colored rubber stock is desired. When this is done, however, favorable physical properties, such as tensile strength, modulus, abrasion resistance, and elongation are frequently forfeited.

The search for reinforcing agents or fillers equal to or better than carbon black is a continuous one among rubber chemists, both in an effort to prepare compounded rubbers having superior properties, and in an effort to provide reinforced rubber stocks that are white or capable of being colored by various pigments. Basic properties common to all suitable rubber reinforcing agents are: (1) the rubber reinforcing agent is relatively inert chemically and has good thermal, light, chemical and solvent stability; (2) the rubber reinforcing agent has a surface area of at least about 5 square meters per gram, and preferably higher than about 15 square meters per gram; and (3) the rubber reinforcing agent is usually an amorphous, low bulk density powder.

Accordingly, an object of my invention is to provide improved rubber compositions and a process for the preparation thereof.

Another object of my invention is to provide a reinforcing filler for rubber compositions.

Another object of my invention is to provide rubber compositions which are white or capable of being colored by various pigments.

Other objects, advantages and features of my invention will be readily apparent to those skilled in the art from the following description, and the appended claims.

I have discovered that product phosphorous compounds obtainable by the reaction of phosphorous acids sulfides or halides, with anhydrous ammonia, or reaction product phosphorous compounds obtainable by the decomposition of phosphorous amides or imides have properties previously enumerated for rubber reinforcing agents and are good reinforcing fillers for rubber compositions. Rubber compositions prepared when employing the inventive reinforcing filler are white and are capable of being colored by various pigments. In addition thereto, the compounded and cured rubbers obtained, when employing the inventive reinforcing filler, have superior properties as measured by elongation, Shore hardness, temperature build-up and resiliences in general.

Illustrative of the reactions that can be employed to prepare the reinforcing fillers of my invention are the following:

(1) $OP(OH)_3 + 3NH_3 \longrightarrow OP(NH_2)_3 + 3H_2O \uparrow$
$OP(NH_2)_3 \longrightarrow OP\equiv N + 2NH_3 \uparrow$ (2) $3P_2S_5 + 10NH_3 \longrightarrow 2P_3N_5 + 15H_2S \uparrow$
$P_3N_5 \longrightarrow 3PN + N_2 \uparrow$ (3) $2PCl_3 + 3NH_3 \longrightarrow P_2(NH)_3 + 6HCl \uparrow$
$2P_2(NH)_3 \longrightarrow 2P_2N_3 \text{(or } P_4N_6) + 3H_2 \uparrow$
$2P_2N_3 \text{(or } P_4N_6) \longrightarrow 4PN + N_2 \uparrow$ (4) $PCl_5 + 2NH_3 \longrightarrow N\equiv P=NH + 5HCl \uparrow$
$3N\equiv P=NH \longrightarrow P_3N_5 + NH_3 \uparrow$ (5) $P(NH_2)_5 \longrightarrow N\equiv P=NH + 3NH_3 \uparrow$ (6) $2P(NH_2)_3 \longrightarrow P_2(NH)_3 + 3NH_3 \uparrow$ It is to be understood that the reaction need not necessarily be carried to completion. This is illustrated by reaction (3) in which the combination of ammonia and heat treatment of $PCl_3$ yields the nitride $P_2N_3$ (or $P_4N_6$), and further heating yields the nitride PN. Another example is reaction (2), in which ammonia treatment of phosphorous pentasulfide yields the nitride $P_3N_5$, and further heating yields the nitride PN. By employing less than the stoichiometric amount of ammonia in any of the reactions involving ammonia, the reaction products of intermediate composition are obtained.

The reactions in which ammonia is a reactant and the decomposition reactions are generally carried out in an inert atmosphere at temperatures of 300 to 1000° C. Low pressure is desirable in both those reactions in which ammonia is a reactant and in the decomposition reactions. In those reactions in which ammonia is a reactant it is preferred that pressures of atmospheric to 100 p.s.i.g. be used. The decomposition reactions can be carried out under vacuum or at pressures up to 100 p.s.i.g. Reaction time can vary from a few minutes to many hours, and is preferably in the range of 1 minute to 100 hours. Various methods of recovering the reaction products for use in preparation of the inventive rubber compositions can be employed. For example, in those reactions where ammonia is the reactant (reactions 1–4), the phosphorous products of the reaction can be separated by extracting the reaction mixture with water. The unreacted reactant material and the product materials other than the phosphorous compounds are water soluble and are thus separated from the water insoluble product phosphorous compounds.

Another method for recovery of the product phosphorous compound from the reaction mixtures of reactions 1–6 comprises heating the reaction mixture so as to volatilize the constituents other than the product phosphorous compounds therefrom. Normally the heating step is conducted at a temperature lower than the reaction temperature. The recovery of the product phosphorous compound by heating is employed in those instances wherein the reaction is conducted in closed systems and wherein the product phosphorous compound volatilizes at a significantly higher temperature than the remaining constituents of the reaction mixture.

The reinforcing fillers of my invention can be blended with any elastomer to provide the inventive rubber composition. The term "elastomer" as herein employed refers to natural rubber, synthetic rubber, or blends thereof. The term "synthetic rubber" shall include butadiene rubbers, isoprene rubbers, chloroprene rubbers, acrylate-butadiene rubbers, isobutylene-isoprene rubbers, nitrile-butadiene rubbers, nitrile-chloroprene rubbers, pyridine-butadiene rubbers, styrene-butadiene rubbers, styrene-chloroprene rubbers, styrene-isoprene rubbers, ethylene-propylene rubbers, chlorosulfonated polyolefins, such as polyethylene and/or polypropylene, fluorocarbon and silicone elastomers, and the like.

The amount of reaction product phosphorous compound employed will generally be in the range between about 5 and 150 parts by weight per 100 parts of elastomer and will be governed by the type product desired. The reaction product can be used alone as a reinforcing agent or in admixture with carbon black or a mineral pigment such as clay, silica, kaolin, calcium silicate, titanium dioxide, hydrated alumina, calcined magnesia, calcium carbonate, zinc sulfide, zinc oxide, or any mixture thereof.

Several methods of blending which are known in the art can be employed to incorporate the reaction product into the rubber stock, for example, the mixing can be effected on a mill along with other compounding ingredients or in an internal mixer, such as a Banbury mixer. Also, a latex masterbatching operation is suitable, in which case an aqueous slurry of the reaction product, with or without other reinforcing agents, is usually first prepared and then mixed with the latex prior to coagulation.

The reinforcing filler and elastomer of my invention can be compounded and cured using conventional compounding and curing recipes well known in the art.

The compound and cured rubbers containing the reinforcing fillers of my invention are particularly suitable for the production of shoe soles, rubber mats, gaskets, and certain other mechanical rubber goods. As the reinforcing fillers of my invention are non-hygroscopic, the said reinforcing fillers are particularly adaptable in the production of rubber compositions employed as a covering to protect fabrics sensitive to moisture.

To more fully describe my invention, the following examples are presented which are meant to be exemplary only, and not to limit my invention unduly.

*Example I*

In this example, reinforcing fillers made by the process of my invention were used in the following compounding recipe:

| | Parts by weight |
|---|---|
| SBR 1500 [1] | 100 |
| Filler | 50 |
| Philrich 5 [2] | 10 |
| Zinc oxide | 3 |
| Stearic acid | 1 |
| Flexamine [3] | 1 |
| Sulfur | 1.75 |
| Santocure [4] | 1.3 |

[1] An SBR butadiene-styrene rubber made according to the recipe o in ASTM D1419–61.
[2] A highly aromatic extender oil.
[3] A physical mixture of a complex diarylamine-ketone reaction product (65%) and N,N'-diphenyl-p-phenylenediamine (35%).
[4] N-cyclohexyl-2-benzothiazolesulfenamide.

In Run 1 (reference Runs 1 of the following Tables I, II and III), the reinforcing filler employed was the reaction product obtained when conducting Reaction 2 at a temperature of 450° C. and water extracting the reaction mixture. Run 2 was made utilizing as the reinforcing filler the reaction product obtained upon conducting reaction at a temperature of 900° C. and water extracting the reaction mixture. Run 3 was made using as the reinforcing filler the reaction product obtained upon conducting Reaction 4 at a temperature of 400° C. and water extracting the reaction mixture to obtain the reaction product. Run 4 was made utilizing the reinforcing filler obtained upon conducting Reaction 4 at a temperature of 900° C. and heat treating the reaction mixture four hours at 400° C. and, using a slight flow of ammonia carrier gas, to recover the reaction product.

In each case the reaction and heat treatment steps were conducted at atmospheric pressure. In preparation of the phosphorus compound reinforcing fillers, the phosphorous compound was placed in a ceramic boat in an electrically heated quartz-tube furnace and conducted into the reaction zone by passing a stream of nitrogen over the compound and gradually increasing temperatures (Runs 1, 2 and 4) or sifted through the reaction zone (Run 3). Nitrogen flow rates and furnace temperatures were:

TABLE I

| Run No. | Nitrogen Rate of Flow, liters per hour | Furnace temperature, ° C. |
|---|---|---|
| 1 | 65 | 370→595 |
| 2 | 65 | 370→595 |
| 4 | 20 | 150→425 |

In the reaction zone, which was a second electrically heated, quartz-tube furnace, the phosphorous compound was contacted with ammonia at the indicated temperature and ammonia flow rates presented below in Table II.

TABLE II

| Run No. | Ammonia Rate of Flow, liters per hour | Furnace Temperature, ° C. |
|---|---|---|
| 1 | 14 | 450 |
| 2 | 22 | 900 |
| 3 | 20 | 400 |
| 4 | 22 | 900 |

Water extraction of the product was effected in Runs 1 and 2 by boiling in water for 30 to 45 minutes, and separating the solid product. In Run 3, an overnight Soxhlet extraction was used. Properties of the compounded rubbers produced in Runs 1, 2, 3 and 4 are presented below in Table III.

TABLE III

| Run No | 1 | 2 | 3 | 4 |
|---|---|---|---|---|
| Filler Surface Area, sq. m./g | 13 | 5 | 36 | 28 |
| 300% Modulus, p.s.i.[1] | 230 | 520 | 240 | 230 |
| Tensile, p.s.i.[1] | 1,380 | 1,220 | [5] 750 | [5] 1370 |
| Elongation, percent [1] | 850 | 450 | 790 | 910 |
| Shore hardness [2] | 47 | 58 | | |
| ΔT, ° F.[3] | 54.2 | 24.2 | | |
| Resilience, percent [4] | 69.5 | 81.8 | | |
| Color of Stock | White | White | White | White |

[1] ASTM D 412–61T. Scott Tensile Machine L–6. 80° F.
[2] ASTM D 676–59T. Shore Durometer, Type A.
[3] ASTM D 623–58. Method A, Goodrich Flexometer, 143 lb./sq. in. load, 0.175-inch stroke. Test specimen is a right circular cylinder 0.7-inch in diameter and 1 inch high.
[4] ASTM D 945–59 (modified). Yerzley oscillograph. Test specimen is a right circular cylinder 0.7 inch in diameter and 1 inch high.
[5] Probably low because of the presence of grit.

It is apparent that compounded rubbers made with the reinforcing fillers of my invention have superior properties of elongation, shore hardness, temperature build-up and resilience.

*Example II*

In this example, a reinforcing filler prepared by Reaction 2 at a temperature of 680° C., followed by heat treatment at 250° C. to recover the reaction product, was compared with a medium thermal (MT) black in the following compounding recipe:

| | Parts by weight |
|---|---|
| Viton B [1] | 100 |
| Filler | 20 |
| Maglite Y [2] | 15 |
| Diak No. 3 [3] | 3 |

[1] A copolymer of vinylidene fluoride and hexafluoropropylene made by E. I. du Pont de Nemours and Company.
[2] Magnesium oxide; vulcanizing agent for Viton.
[3] N,N'-dicinnamylidene-1,6-hexanediamine.

Properties of the compound fluoroelastomer after being pressure-cured 30 minutes at 307° F., and then heated one hour at 212° F., one hour at 250° F., one hour at 300° F., one hour at 350° F., and 24 hours at 400° F. are:

| Filler | MT Black (Thermax) | Reaction 2 |
|---|---|---|
| Filler Surface Area, sq. m./g. | 8 | 8 |
| Tensile, p.s.i. | 2,350 | 2,240 |

These data illustrate that the use of the reinforcing filler of my invention and a carbon black having the same surface area resulted in compounded fluoroelastomers having about the same tensile strength.

As will be evident to those skilled in the art, various modifications of this invention can be made, or followed, in the light of the foregoing disclosure, without departing from the spirit or scope thereof.

I claim:

1. A rubber composition comprising an elastomer and at least one product phosphorous compound recovered from a reaction selected from the group consisting of (1) a reaction of a phosphorous acid with anhydrous ammonia, (2) a reaction of a phosphorous sulfide with anhydrous ammonia, (3) a reaction of a phosphorous halide with anhydrous ammonia, (4) the decomposition of a phosphorous imide, and (5) the decomposition of a phosphorous amide, said reaction being carried out at a temperature between 300 and 1000° C.

2. The rubber composition of claim 1 wherein the concentration of said reaction phosphorous compound product is in the range between about 5 and 150 parts by weight per 100 parts of elastomer.

3. A compound and cured rubber containing a reinforcing filler said reinforcing filler comprising at least in part a product phosphorous compound recovered from a reaction selected from the group consisting of (1) a reaction of phosphorous acid with anhydrous ammonia, (2) a reaction of a phosphorous sulfide with anhydrous ammonia, (3) a reaction of phosphorous halide with anhydrous ammonia, (4) the decomposition of a phosphorous imide, and (5) the decomposition of a phosphorous amide, said reaction being carried out at a temperature between 300 and 1000° C.

4. The rubber of claim 3 wherein the elastomer of said rubber comprises a butadiene-styrene polymer and wherein said product phosphorous compound is obtainable from the reaction of a phosphorous sulfide with anhydrous ammonia.

5. The rubber of claim 3 wherein the elastomer of said rubber comprises a butadiene-styrene polymer and wherein said product phosphorous compound is obtainable from a reaction selected from the group consisting of (1) the decomposition of a phosphorous imide, and (2) the decomposition of a phosphorous amide.

6. A process of reinforcing an elastomer which comprises incorporating into said elastomer at least one product phosphorous compound recovered from a reaction selected from the group consisting of (1) a reaction of a phosphorous acid with anhydrous ammonia, (2) a reaction of a phosphorous sulfide with anhydrous ammonia, (3) a reaction of a phosphorous halide with anhydrous ammonia, (4) the decomposition of a phosphorous imide, and (5) the decomposition of a phosphorous amide, said reaction being carried out at a temperature between 300 and 1000° C.

7. The process of claim 6 wherein the concentration of said product phosphorous compound is in the range between 5 to 150 parts by weight per 100 parts of elastomer.

8. The rubber of claim 3 wherein said elevated temperature is between 300 and 1000° C., the elastomer of said rubber comprises a butadiene-styrene polymer and wherein said product phosphorous compound is recovered from the reaction of a phosphorous chloride with anhydrous ammonia.

No references cited.

MORRIS LIEBMAN, *Primary Examiner.*

J. WALDRON, S. FOX, *Assistant Examiners.*